US 7,818,662 B2
Oct. 19, 2010

(12) United States Patent
Nene et al.

(54) INTEGRATING LINE-OF-BUSINESS APPLICATION DATA WITH DOCUMENTS

(75) Inventors: Bhushan Sharad Nene, Foothill Ranch, CA (US); Chris Alan Keyser, Snoqualmie, WA (US)

(73) Assignee: Microsoft Corporation, Redmond, WA (US)

(*) Notice: Subject to any disclaimer, the term of this patent is extended or adjusted under 35 U.S.C. 154(b) by 1355 days.

(21) Appl. No.: 11/267,855

(22) Filed: Nov. 4, 2005

(65) Prior Publication Data

US 2007/0106933 A1    May 10, 2007

(51) Int. Cl.
    G06F 17/30    (2006.01)
(52) U.S. Cl. .................. 715/224; 715/223; 715/225
(58) Field of Classification Search .......... 715/224, 715/223, 225
    See application file for complete search history.

(56) References Cited

U.S. PATENT DOCUMENTS

| 6,507,856 | B1* | 1/2003 | Chen et al. .................. 715/205 |
| 7,281,018 | B1* | 10/2007 | Begun et al. ................ 707/102 |
| 7,376,891 | B2* | 5/2008 | Hitchock et al. ............. 715/221 |
| 7,451,392 | B1* | 11/2008 | Chalecki et al. ............. 715/234 |
| 7,546,602 | B2* | 6/2009 | Hejlsberg et al. ............ 719/313 |
| 2003/0004874 | A1* | 1/2003 | Ludwig et al. ................ 705/40 |
| 2004/0141508 | A1* | 7/2004 | Schoeneberger et al. ..... 370/401 |
| 2004/0153465 | A1* | 8/2004 | Singleton et al. ............ 707/100 |
| 2004/0181544 | A1* | 9/2004 | Anderson .................... 707/102 |
| 2005/0125781 | A1* | 6/2005 | Swamy et al. ............... 717/144 |
| 2005/0125788 | A1* | 6/2005 | Lupini et al. ................. 717/174 |
| 2005/0138160 | A1* | 6/2005 | Klein et al. .................. 709/223 |

OTHER PUBLICATIONS

Sybase, INC Business Message Translation Options Version 2.0, Mar. 2001, http://download.sybase.com/pdfdocs/epg0200e/mapper.pdf.*

* cited by examiner

*Primary Examiner*—Joshua D Campbell
*Assistant Examiner*—Christopher Bryant
(74) *Attorney, Agent, or Firm*—Shook, Hardy & Bacon L.L.P.

(57) ABSTRACT

Merging data from LOB applications into document templates within productivity applications without the need for custom programming is provided. A document template within a productivity application is provided, and an XML schema is attached to the document template. The XML schema allows the LOB application data to be modeled generically using a business object paradigm. Meta-data is accessed from the LOB application. Using the attached XML schema, a user may mark-up the document template with schema nodes corresponding to the meta-data from the LOB application. Data from the LOB application may then be accessed and merged into the schema nodes, creating a data-merged document. Data may be further interactively merged from the LOB application into the data-merged document.

20 Claims, 12 Drawing Sheets

FIG. 4.

```
<?xml version="1.0" encoding="utf-8"?>
<xs:schema
xmlns="http://www.microsoft.com/OfficeLOBIntegration/BusinessObject"
attributeFormDefault="unqualified" elementFormDefault="qualified"
targetNamespace="
http://www.microsoft.com/OfficeLOBIntegration/BusinessObject"
version="1.0.0" xmlns:xs="http://www.w3.org/2001/XMLSchema">

<xs:complexType name="PropertyType">
    <xs:attribute name="Name" form="unqualified"
        type="xs:string" />
</xs:complexType>

<xs:complexType name="BusinessObjectType">
    <xs:sequence>
        <xs:element minOccurs="0" maxOccurs="unbounded"
            name="Property" type="PropertyType" />
        <xs:element minOccurs="0" maxOccurs="unbounded"
            name="RelatedBusinessObject" type="BusinessObjectType" />
    </xs:sequence>
    <xs:attribute name="Id" form="unqualified" type="xs:string" />
    <xs:attribute name="Name" form="unqualified"
        type="xs:string" />
    <xs:attribute name="RelationToParent"
        form="unqualified" type="xs:string" />
</xs:complexType>

<xs:element name="BusinessObject" type="BusinessObjectType">
</xs:element>

</xs:schema>
```

INTEGRATING LINE-OF-BUSINESS APPLICATION DATA WITH DOCUMENTS

CROSS-REFERENCE TO RELATED APPLICATIONS

The subject matter of this application is related to the subject matter of co-pending U.S. patent application Ser. No. 11/271,697, filed Nov. 10, 2005, entitled "Meta-Data Driven Server-Side Merging Of Data With Documents," assigned or under obligation of assignment to the same entity as this application.

STATEMENT REGARDING FEDERALLY SPONSORED RESEARCH OR DEVELOPMENT

Not Applicable.

BACKGROUND

Enterprises frequently generate a variety of business documents for daily business activities. These documents may include purchase orders, invoices, thank-you letters, invitation letters, and the like. The primary responsibility for generating these documents typically falls upon information workers, who are the employees within the business enterprises that spend a majority of their time analyzing and reporting on information about their business and making decisions based on these analyses. When generating the business documents, information workers typically employ productivity software applications, such as word processing applications, spreadsheet applications, electronic mail applications, and presentation applications, for example.

Although information workers often employ productivity applications to generate business documents, key business information needed for the documents typically resides in large, back-end databases and line-of-business (LOB) applications. These LOB applications capture and store a wide variety of business information and include systems, for example, for resource planning, customer relationship management, financial reporting, accounting, and project management. LOB applications typically include databases or data warehouses, servers, and server applications that collect and manage the data, and in many cases, specialized front-end applications that enable users to interact with the data.

There exists a deep divide between the LOB applications used to collect and store business information and productivity applications typically used by information workers to generate business documents. Currently, neither productivity applications nor LOB applications provide a convenient solution for information workers to merge LOB application data with business documents in productivity applications. Generally, when information workers generate business documents, they must create the document using a productivity application, switch to an LOB application, copy required business data, switch back to the productivity application, and paste the business data into the document. This approach sacrifices productivity as information workers must continuously switch back and forth between various applications. In addition, the act of copying and pasting data from one application to another introduces opportunities for error.

Another approach is to develop custom solutions for merging LOB application data with productivity application documents. For example, macro programming may be performed to pull data from external LOB applications and place the data within sections of a document within a productivity application. However, development of such custom solutions requires specialized knowledge that the typical information worker does not possess. Instead, programmers from an IT department are often required to develop the custom solutions. Accordingly, such custom solutions are inefficient, requiring programming and IT costs to be incurred. In addition, each custom solution is very specific to a particular document, requiring a solution to be developed for each business document used by an enterprise. Further, if any changes are required to a particular business document, a programmer must modify the custom solution.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to creating data-merged documents by integrating LOB application data into document templates within productivity applications. LOB application meta-data is accessed and relationships among the corresponding data are modeled using a generic XML schema to define business objects and properties within the LOB application data. The generic XML schema is attached to a document template within a productivity application, allowing a user, such as an information worker, to mark-up the document template with schema nodes corresponding to the accessed meta-data. A context sensitive user interface showing related business objects and properties may be provided for marking up the document template. LOB application data may then be merged into the document template based on the attached schema nodes, creating a data-merged document. The initial data merge may leave the document mark-up intact and retain an active link between the document and LOB application, allowing for further interactive data merging. A context sensitive user interface may be provided that allows querying underlying business object data and interactively merging the data into the document.

BRIEF DESCRIPTION OF THE SEVERAL VIEWS OF THE DRAWING

The present invention is described in detail below with reference to the attached drawing figures, wherein:

FIG. 4 is a screen display showing an exemplary document template;

FIG. 5 is an exemplary XML schema in accordance with an embodiment of the present invention;

FIG. 10 is an illustrative screen display of a data-merged document in accordance with an embodiment of the present invention;

FIG. 12 is an illustrative screen display showing a data-merged document and associated user interface for interactively merging data into the data-merged document, wherein the ancestor hierarchy for a selected business object does not contain any one-to-many relationships in accordance with an embodiment of the present invention.

DETAILED DESCRIPTION

Figure 1:
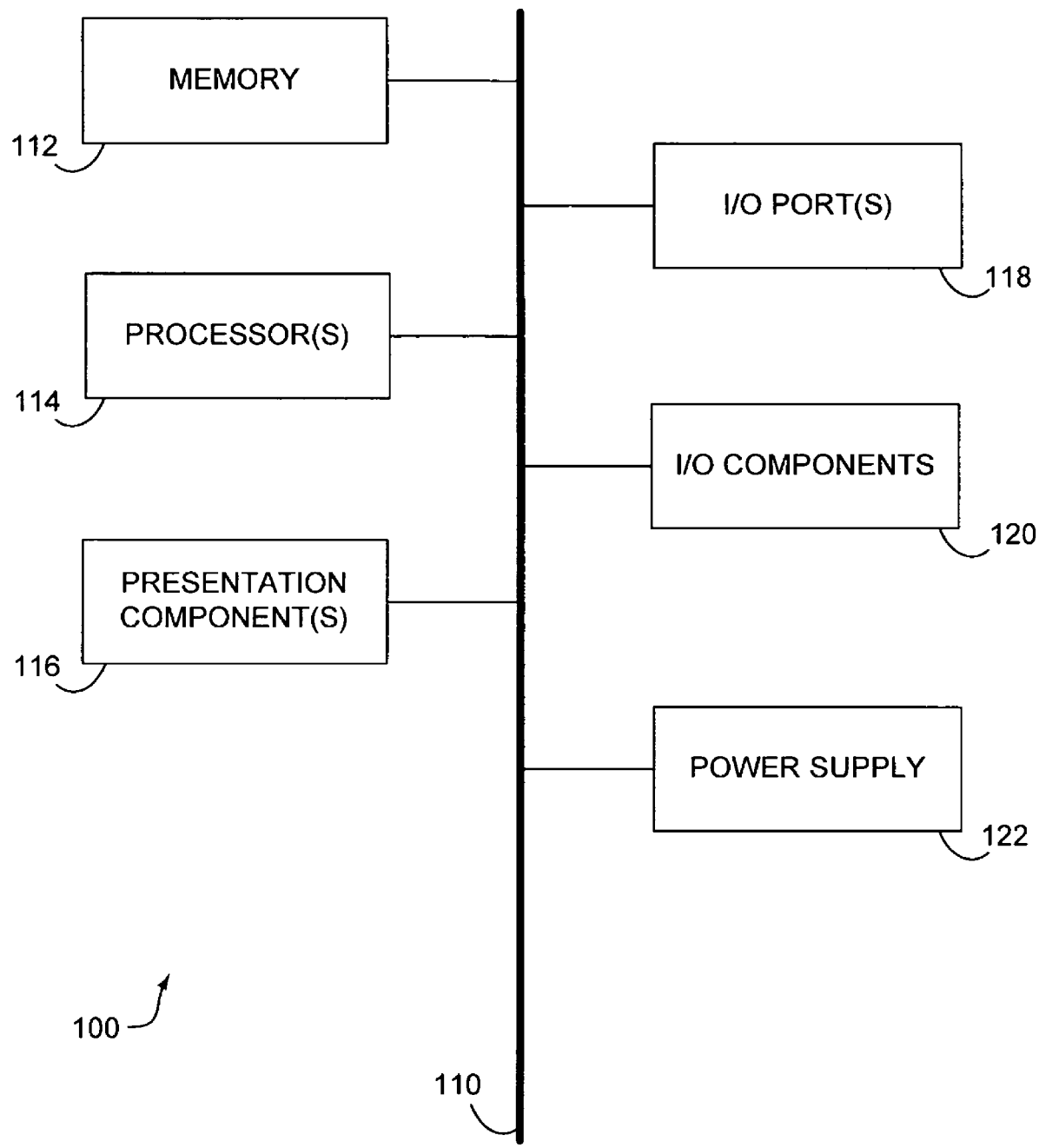
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Embodiments of the present invention, among other things, allow information workers to merge LOB application data into document templates within productivity applications to generate data-merged business documents without the need for custom programming. LOB applications may contain a wide variety of business information, such as customer information, purchase order information, billing information, account information, and the like. Thus, the nature of LOB application data has made it difficult to easily merge the data into documents without the need for some form of custom programming.

Generally, LOB applications represent data as relation tables or business objects that are inherently linked by relationships. Accordingly, embodiments of the present invention utilize a business object paradigm to generically model LOB application data as related business objects and associated properties. LOB application data and relationships are modeled with a generic extensible mark-up language (XML) schema, which may be mapped to a document template to capture the contextual hierarchy of business objects and properties and the relationships between them.

In accordance with embodiments of the invention, meta-data is accessed from an LOB application that may expose its data as self-describing XML data. An XML schema that may generically model the LOB application data using the accessed meta-data is attached to a document template within a productivity application. Using the attached schema and corresponding meta-data, an information worker may map schema nodes within the document template. The schema nodes serve as placeholders for data from the LOB application. LOB application data may then be merged into the document template based on the schema nodes, creating a data-merged document. In some embodiments, the data merge leaves the document mark-up intact, such that the user may further modify the document and interactively merge LOB application data into the document.

Accordingly, in one aspect, an embodiment of the invention is directed to a method, implemented at least in part by a computing device, for generating a data-merged document by integrating data from an LOB application with a document template within a productivity application. The method includes accessing meta-data from the LOB application. The method also includes attaching an XML schema to the document template. The XML schema provides a generic business object schema for modeling the data from the LOB application as one or more business objects and one or more business object properties based on the meta-data from the LOB application. The method further includes mapping one or more schema nodes to the document template based on user input. The one or more schema nodes correspond to the meta-data from the LOB application. The method still further includes accessing data from the LOB application and merging the data from the LOB application into the document template based on the one or more schema nodes mapped to the document template to create the data-merged document.

In another aspect, an embodiment of the present invention relates to a method in a computer system having a graphical user interface including a display and a user interface selection device. The method is for mapping a schema node to a document template within a productivity application. The schema node serves as a placeholder for merging data from an LOB application into the document template. The method includes determining a current location within the document template. The method also includes querying meta-data from the LOB application based on the current location within the document template. The method further includes displaying a context-sensitive user interface on the display based on the meta-data from the LOB application. The context-sensitive user interface comprises a context area indicating a current business object associated with the current location within the document template, a related business object area indicating related business objects having a relationship with the current business object, and a business object properties area indicating business object properties associated with the current business object. The method further includes receiving, via the user interface selection device, a user selection of one of the related business objects or the business object properties. The method still further includes mapping the schema node to the current location within the document template based on the user selection.

In a further aspect of the invention, an embodiment is directed to a method in a computer system having a graphical user interface including a display and a user interface selection device. The method is for interactively merging data from an LOB application into a document template, wherein the document template has schema nodes mapped to it. The method includes determining a current schema node within the document template and determining a business object associated with the current schema node. The method also includes displaying a context-sensitive user interface on the display based on the business object associated with the current schema node. The context-sensitive user interface comprises data from the LOB application corresponding to the business object associated with the current schema node. The method further includes receiving, via the user interface selection device, a user selection of one or more instances of the data from the LOB application. The method still further includes copying the one or more instances of the data from the LOB application to the current schema node within the document template based on the user selection.

Exemplary Operating Environment

Having briefly described an overview of the present invention, an exemplary operating environment for the present invention is described below.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Overall Integration Process Flow

Figure 2:
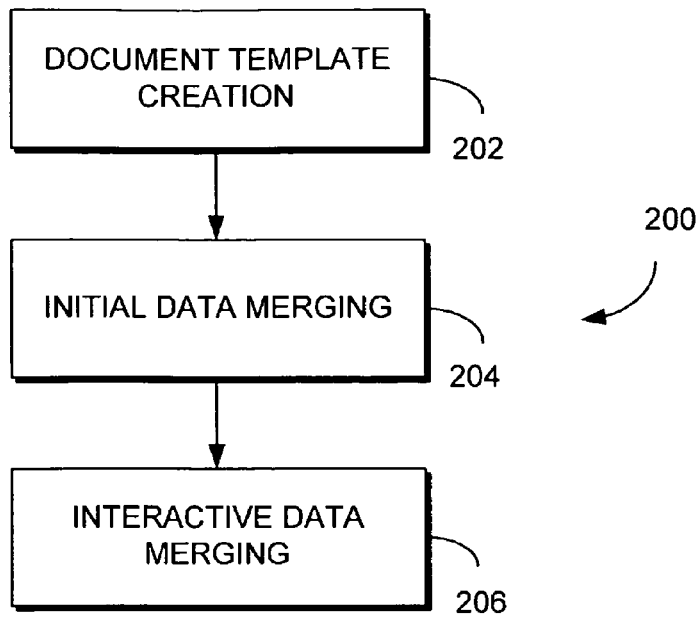
FIG. 2 is a flow diagram showing an overall method for integrating LOB application data into a productivity application document in accordance with an embodiment of the present invention.

Referring now to FIG. 2, a flow diagram is provided illustrating an overall process 200 for integrating LOB application data with a document template within a productivity application in accordance with an embodiment of the present invention. Generally, integration of LOB application data with a document template may consist of three broad steps. At the outset, a document template within a productivity application is marked-up with schema nodes acting as placeholders for merging LOB application data, as shown at block 202. To mark-up a document template, meta-data is accessed from an LOB application, and an XML schema is attached to the document template for modeling LOB application data based on the accessed meta-data. Using the attached XML schema, an information worker may attach schema nodes to the document template. The schema nodes serve as placeholders for merging LOB application data into the document template.

After a marked-up document template has been generated, an initial LOB data merging process may proceed, as indicated at block 204. A data query is created based on the schema nodes attached to the document template, and the data query is sent to the LOB application, which provides data based on the query. The data is then copied into the schema nodes within the document template, creating a data-merged document.

After LOB application data has initially been merged with the document template, LOB application data may further be interactively merged with the data-merged document, as represented by block 206. For example, information workers may wish to further modify a document after an initial data merge. Accordingly, embodiments of the present invention leave the document markup intact after the initial data merge. LOB application data may then be interactively queried and copied into the document template based on input from an information worker.

Each of document template creation, initial data merging, and interactive data merging is more fully discussed below.

Document Template Creation

Figure 3:
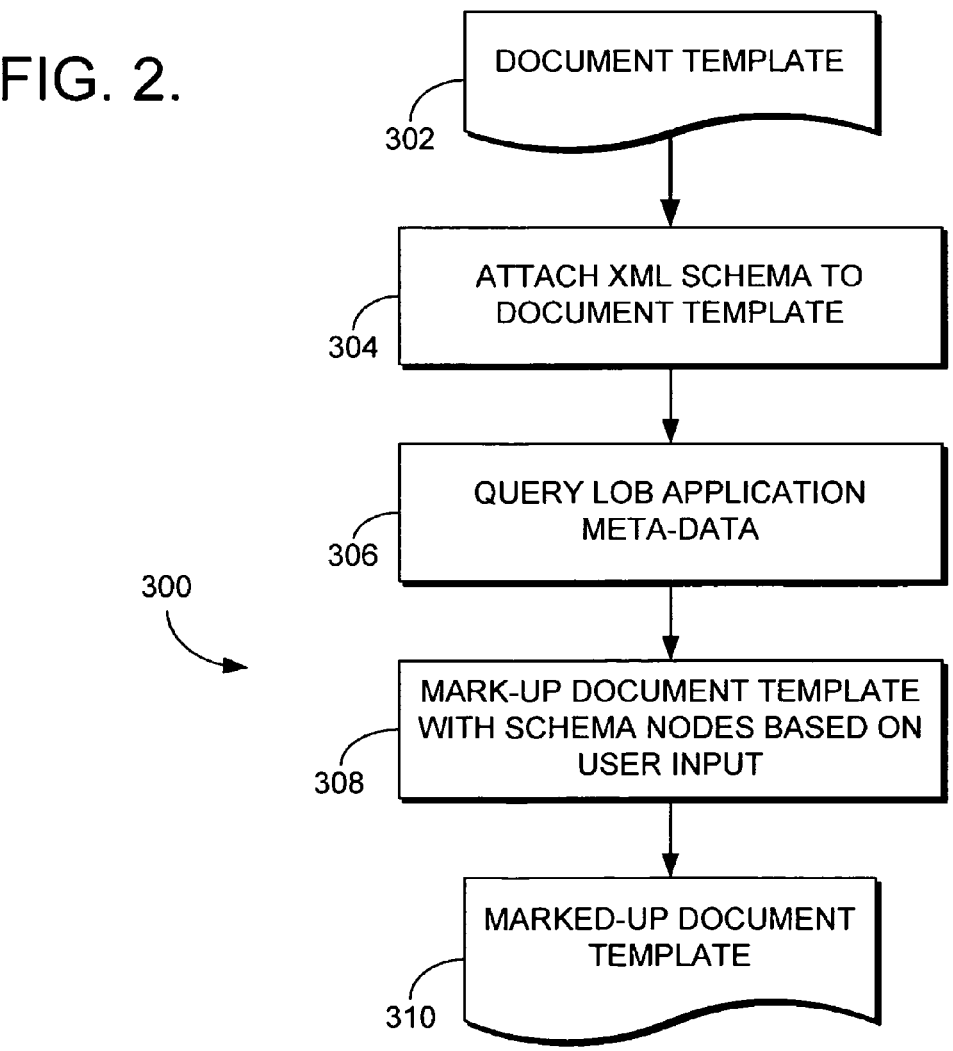
FIG. 3 is a flow diagram showing a method for marking up a document template with schema nodes corresponding with meta-data representing the structure of LOB application data in accordance with an embodiment of the present invention.

FIG. 3 provides a flow diagram illustrating a more detailed method 300 for marking up a document template 302 with meta-data representing the structure of LOB application data in accordance with an embodiment of the present invention.

Generally, a business enterprise may have a variety of standard document templates for purchase orders, invoices, and the like. In addition, an information worker may employ a productivity application to create a document template as required for a particular business activity when a standard document template is not available. The document template 302 of FIG. 3 represents one of these document templates within a productivity application. The document template 302 may be considered a "blank" template, as it has not yet been marked up with any schema nodes and does not yet contain any LOB application data.

Figure 4:
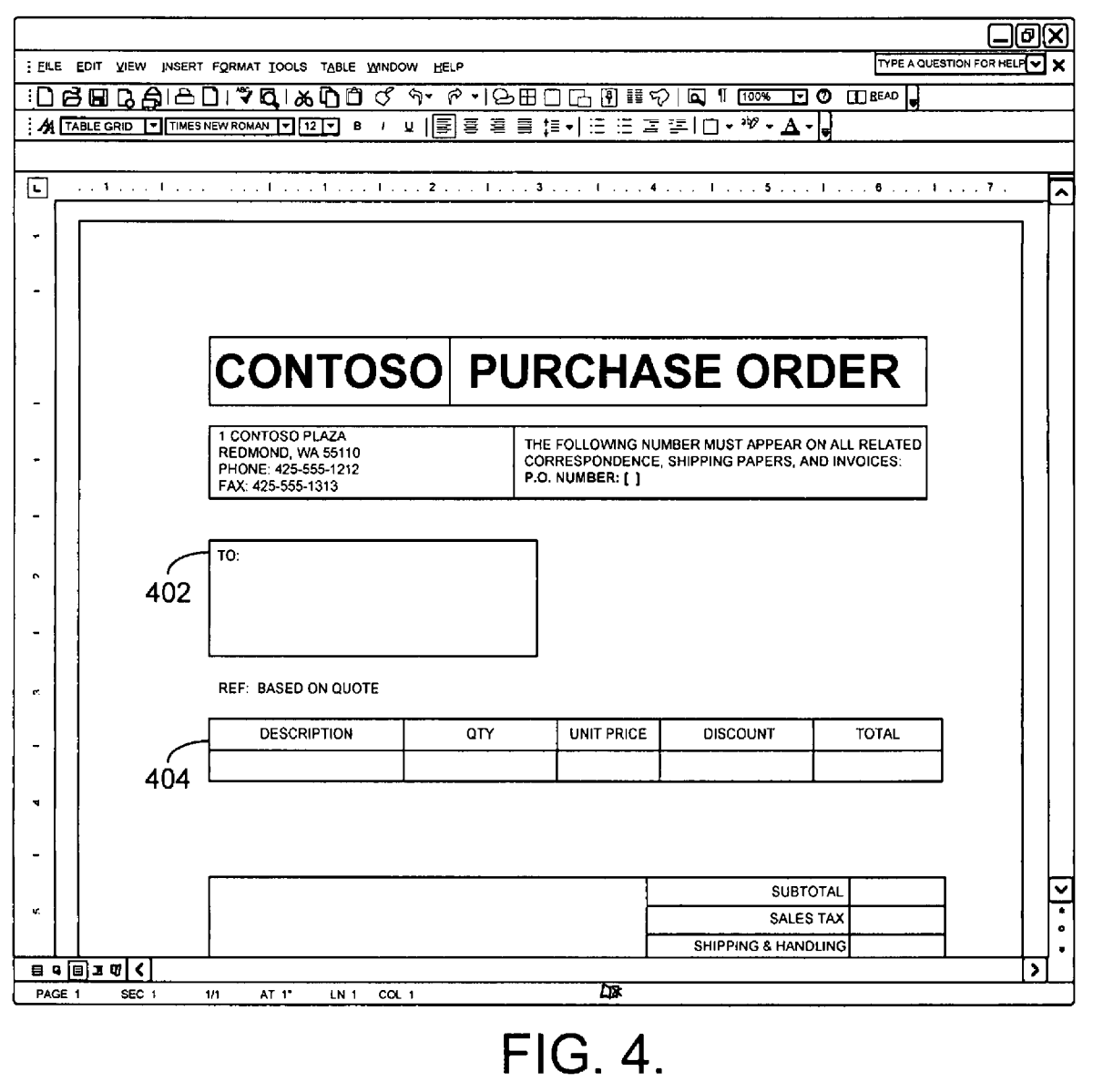

An example of a document template is illustrated in FIG. 4. In particular, the document template illustrated in FIG. 4 is for a purchase order. As shown, the template includes a number of areas for which business information is required. For example, a company information area 402 is provided to indicate the customer to which the purchase order is directed. In addition, a table 404 is included for listing product information that is being quoted to the customer. It should be noted that the purchase order shown in FIG. 4 is provided for illustrative purposes only and embodiments of the present invention may be directed to any type of document.

Referring again to FIG. 3, to mark-up the document template 302 with meta-data, an XML schema is attached to the document template 302, as shown at block 304. The XML schema allows LOB application data to be generically modeled. As discussed previously, LOB application data may vary widely for different business documents and may also vary widely from one LOB application to another. Accordingly, to provide a common solution without the need for custom programming, embodiments of the present invention model LOB application data generically using an XML schema based on a business object paradigm. The XML schema treats LOB application meta-data and data generically and hence can be used with any LOB application that can expose meta-data and data in standard XML format. An exemplary XML schema defining such a business object paradigm in accordance with an embodiment of the present invention is shown in FIG. 5.

According to this business object paradigm, LOB application data may consist of any number of business objects. Each business object may have one or more associated properties and zero or more related business objects. In addition, each related business object is also a generic business object, thus creating a recursive object hierarchy. Further, the relationship between business objects may be either a one-to-one relationship or a one-to-many relationship that may be based on a foreign key concept. As such, this business object paradigm can model any LOB application data generically, eliminating the need for creating, maintaining, and deploying a large schema library.

As an example of a recursive business object hierarchy, data for a purchase order may include a number of related business objects and associated properties. At the top level, the LOB application data may comprise an opportunity business object, which tracks leads to customers. The opportunity business object may then have a parent-child relationship with a number of related business objects, such as a customer business object (e.g., a customer associated with a particular business opportunity), an owner business object (e.g., a sales person associated with a particular business opportunity), and a quote business object (e.g., quote information associated with a particular business opportunity). Each quote business object may further have a parent-child relationship with a product line items business object (e.g., each product included in a quote). The relationship between the business objects may be either a one-to-one or one-to-many relationship. For example, typically only one customer will be associated with a particular opportunity. Accordingly, the opportunity and customer business objects may have a one-to-one relationship. In contrast, a quote may contain multiple product line items, thereby creating a one-to-many relationship between quote and product line items business objects. Further, each business opportunity may have a number of associated properties. For example, properties for a customer business object may include a company name, address, city, state, and zip code. As another example, properties for each product within a product line items business object may include a product description, quantity, and unit price.

The generic business object schema may be used to mark-up the document template 302 in conjunction with meta-data from the LOB application. Accordingly, LOB application meta-data is queried, as shown at block 306. The LOB application may expose this meta-data in standard XML format. A variety of ways of exposing the meta-data may be employed within the scope of the present invention. By way of example only and not limitation, the LOB application may expose data as XSD or ADO.NET datasets that represent business objects as data tables, properties as data columns, and relationships as data relations. Additionally, LOB application meta-data may be exposed via web services.

Using the attached XML schema and corresponding meta-data accessed from the LOB application, an information worker may mark-up the document template 302 with schema nodes, as shown at block 308. The schema nodes correspond with the meta-data from the LOB application, thereby mapping business objects and properties to the document template. The result of the process is a marked-up document template 310, having schema nodes attached that serve as placeholders for merging LOB application data.

Although some productivity applications (such as MICROSOFT WORD and MICROSOFT EXCEL, for example) provide a user interface for attaching a schema and marking up documents with schema nodes, the approach may work well with simple schema only and may be non-intuitive for working with a generic and recursive schema. Thus, in some embodiments of the present invention, a context-sensitive user interface may be provided for marking up a document template with schema nodes that is more intuitive for a user, such as an information worker. For example, user interface data may be displayed in an action pane beside the document template within the productivity application. In other embodiments, the user interface may be displayed as its own managed window, mimicking the behavior of an undocked action pane.

Figure 6:
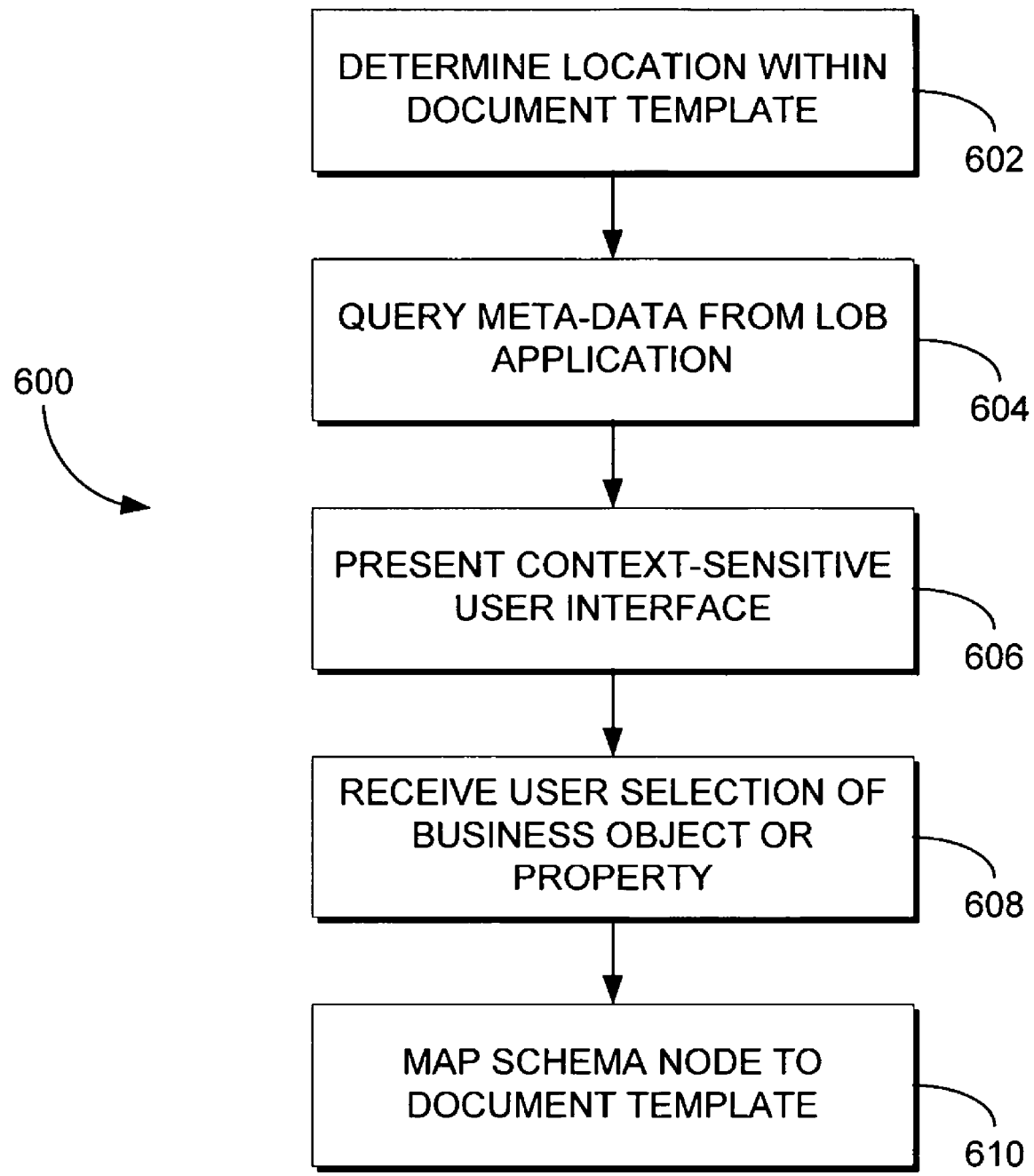
FIG. 6 is a flow diagram showing a method for providing a user interface to mark-up a document template with schema nodes in accordance with an embodiment of the present invention.

Referring to FIG. 6, a flow diagram is provided illustrating an exemplary method 600 for providing a user interface to mark-up a document template with schema nodes in accordance with an embodiment of the present invention. Initially, as shown at block 602, the current location within the document template is determined. Based on the current location within the document template, meta-data from the LOB application is queried, as shown at block 604. For example, a user may have selected a region of the document template corresponding with a business object schema node that has been mapped to the document template. The LOB application is queried for meta-data corresponding with related business objects and business object properties associated with the current business object schema node. Based on the queried data, a context-sensitive user interface is provided, as shown at block 606. The user interface may display the current business object, any related business objects, and any business object properties. A user may then select a particular related business object or a business object property, as shown at block 608. A schema node is then mapped to the document template based on the selection, as shown at block 610.

Figure 7:
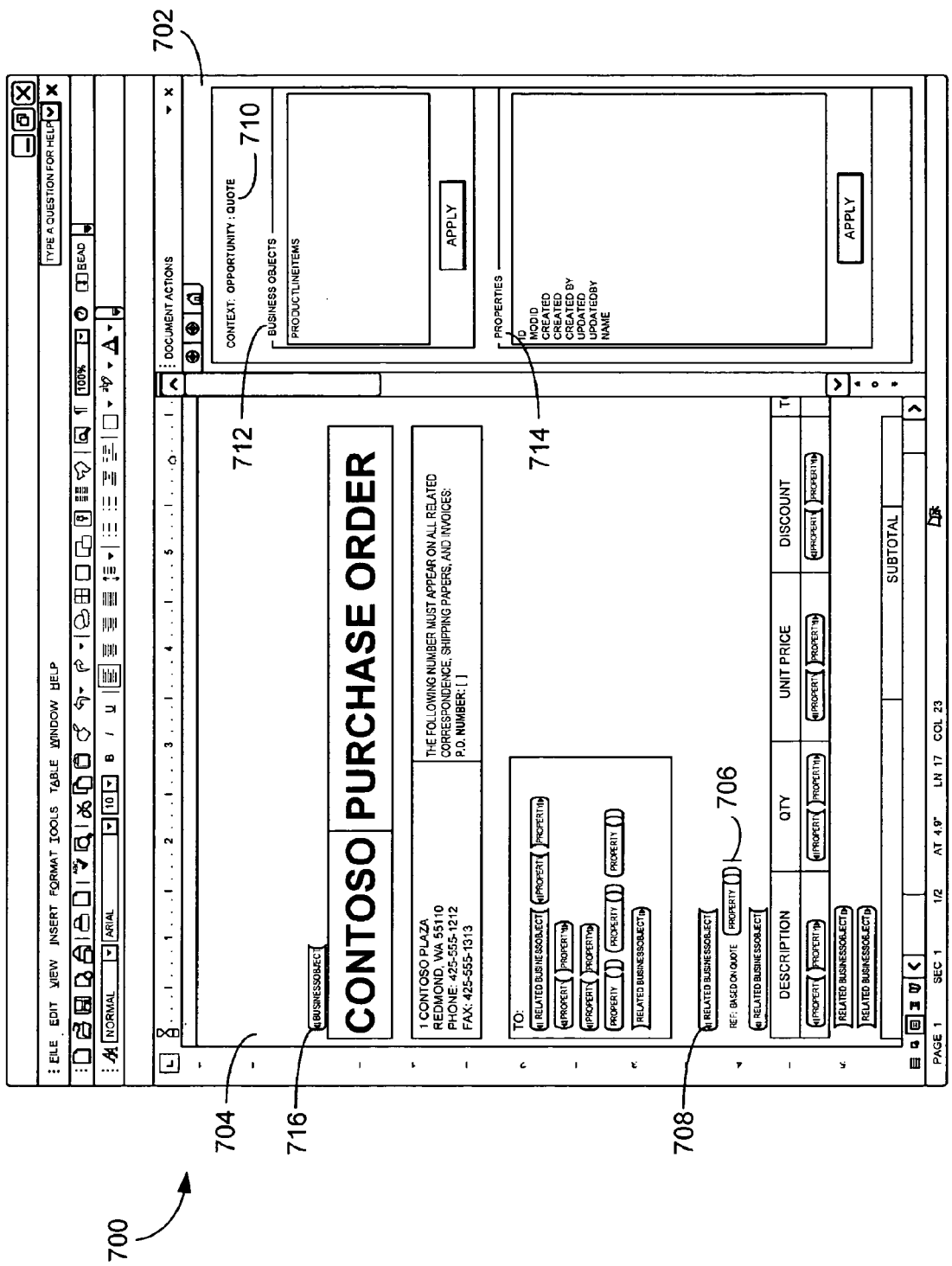
FIG. 7 is an illustrative screen display of a document template marked-up with schema nodes and a user interface action pane for marking up the document template with schema nodes in accordance with an embodiment of the present invention.

A screen display 700 is provided in FIG. 7 illustrating an exemplary context-sensitive user interface for marking up a document template with schema nodes in accordance with an embodiment of the present invention. The user interface is presented as an action pane 702 located adjacent to a document template 704 within a productivity application. The action pane 702 provides high-level semantics, such as "Opportunity," "Quote," and "Company," for example, as opposed to schema nodes, making it more intuitive for an information worker. An information worker may select a region of the document template and, using the action pane 702, associate the region with a relevant business object or property.

At the outset, an information worker may associate a top-level business object with the entire document template 704 or a portion of the template. For example, an information worker may select the entire document template 704 and apply an opportunity business object using the action pane 702. As the information worker moves the cursor within the scope of an attached business object schema node within the document template, the action pane 702 presents related business objects and properties for the current business object by inquiring the meta-data from the LOB application. For example, the cursor 706 in the screen display 700 is located within a quote business object schema node 708. Accordingly, the action pane 702 provides a current context area 710, a related business objects area 712, and an associated properties area 714, providing information associated with the quote business object. For example, the current context area 710 indicates that the cursor 706 is currently within a quote business object, which is a child of an opportunity business object. In addition, the related business objects area 710 within the action pane 702 indicates that product line items business object is a child business object of the quote business object. Further, the properties area 714 indicates that properties of the quote business object include ID, Modid, Created, CreatedBy, Updated, UpdatedBy, and Name.

Figure 8:
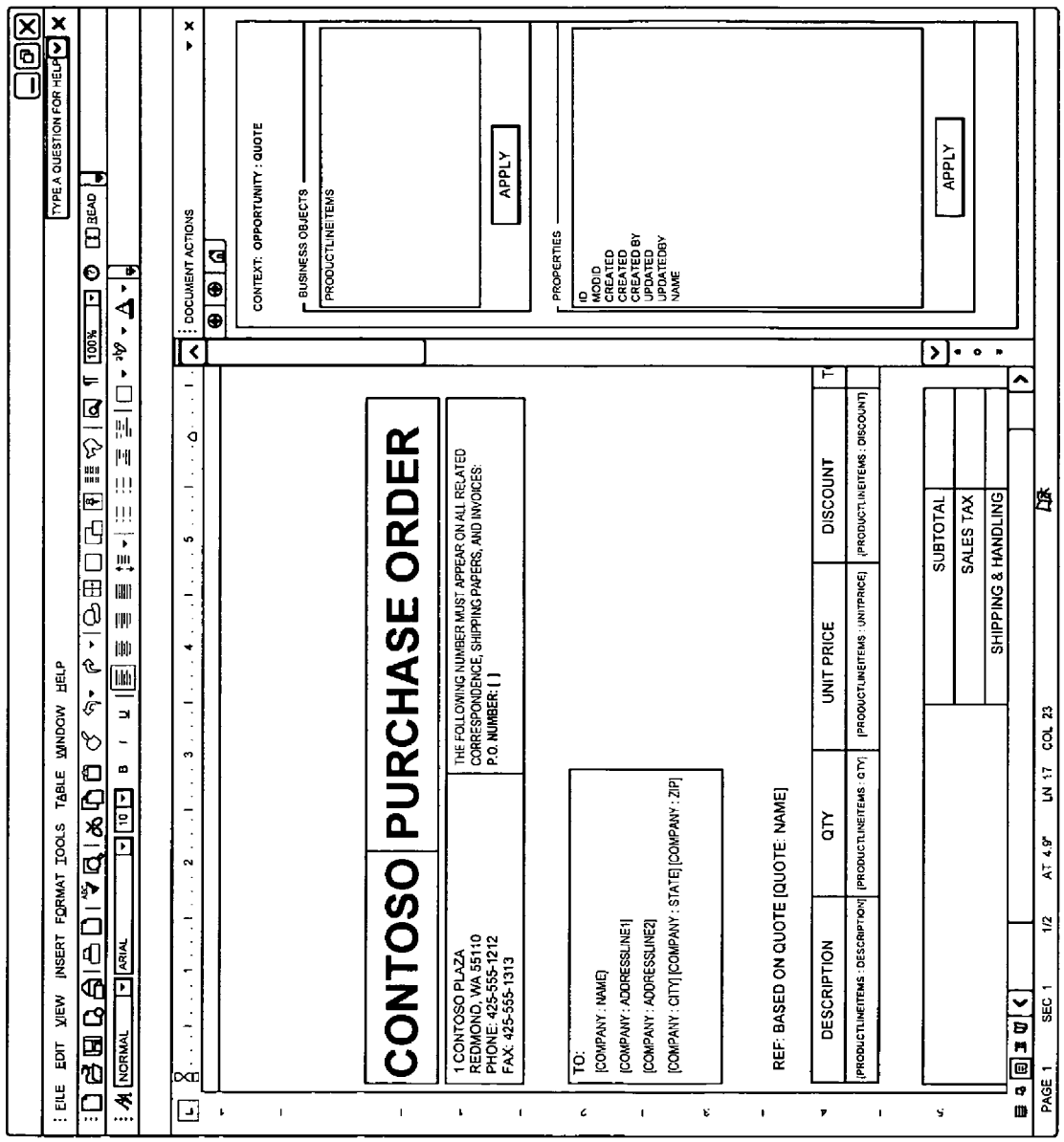
FIG. 8 is an illustrative screen display showing an alternate view of the document template and user interface of FIG. 7, in which XML tags are replaced with placeholder text in accordance with an embodiment of the present invention.

The screen display shown in FIG. 7 illustrates a view of a marked-up document template in which placeholders are shown as XML tags, such as tag 716, for example. An alternate view of the marked-up document is provided in FIG. 8. In the alternate view, the placeholders are shown as text, which is more intuitive than the XML tags. An information worker may be able to toggle between the two views.

Initial LOB Data Merging

Figure 9:
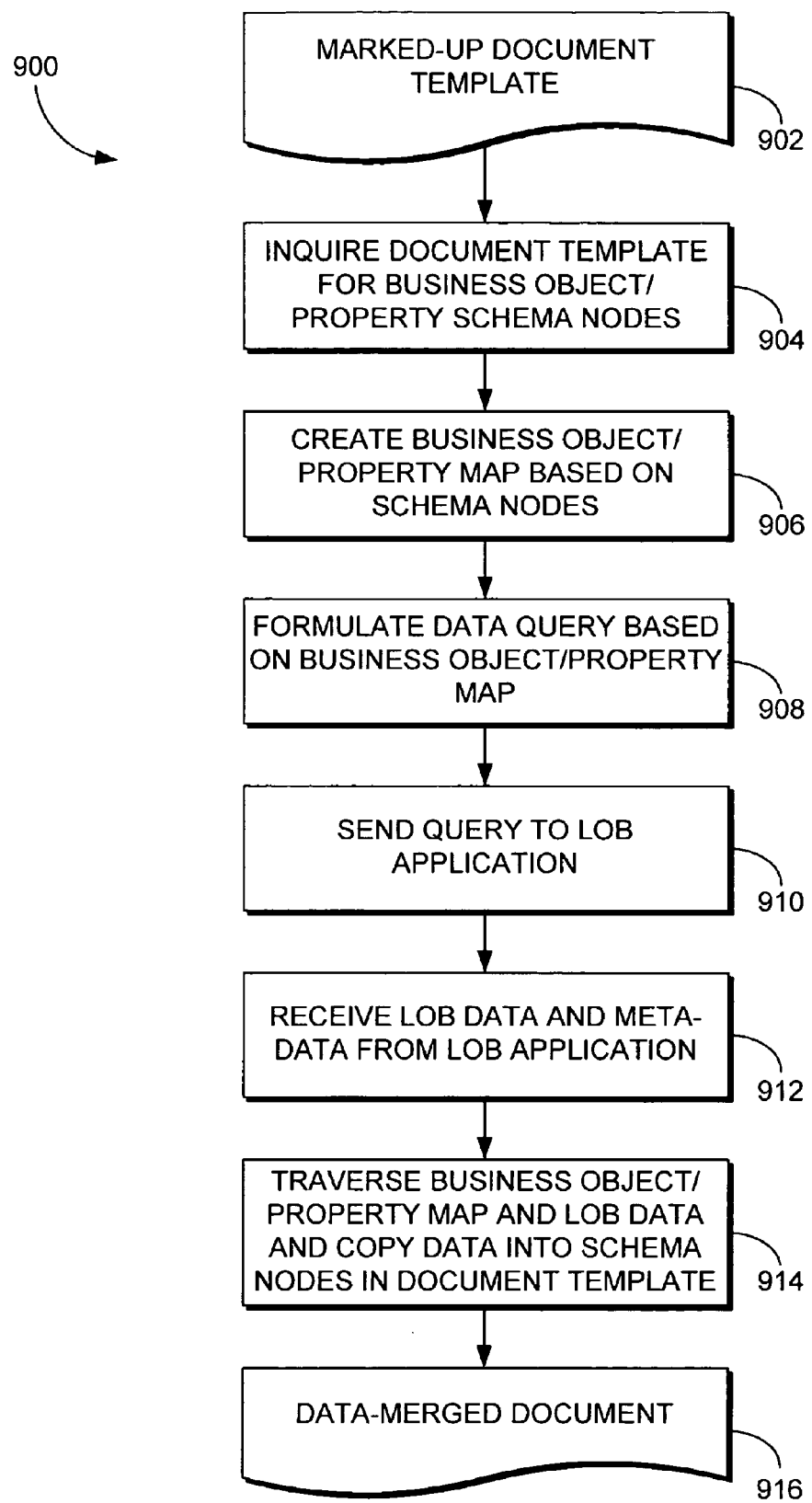
FIG. 9 is a flow diagram showing a method for merging LOB application data into a marked-up document template in accordance with an embodiment of the present invention.

After an information worker marks up a document template with schema nodes, LOB application data may be merged into the marked-up document template to create a data merged business document. Turning to FIG. 9, a flow diagram is provided illustrating an exemplary method 900 for merging LOB application data into a marked-up document template 902. Initially, as shown at block 904, the marked-up document template 902 is inquired for all attached schema nodes. The business object hierarchy may then be re-created based on the attributes associated with each schema node, as shown at block 906. This hierarchy may comprise a map of the business objects and properties that are required to populate the marked-up document template 902. The map is traversed to formulate a data query for the LOB application, as shown at block 908. The query may then be sent to the LOB application, as shown at block 910, via an exposed web service, specific API or adapter, or the like.

Figure 10:
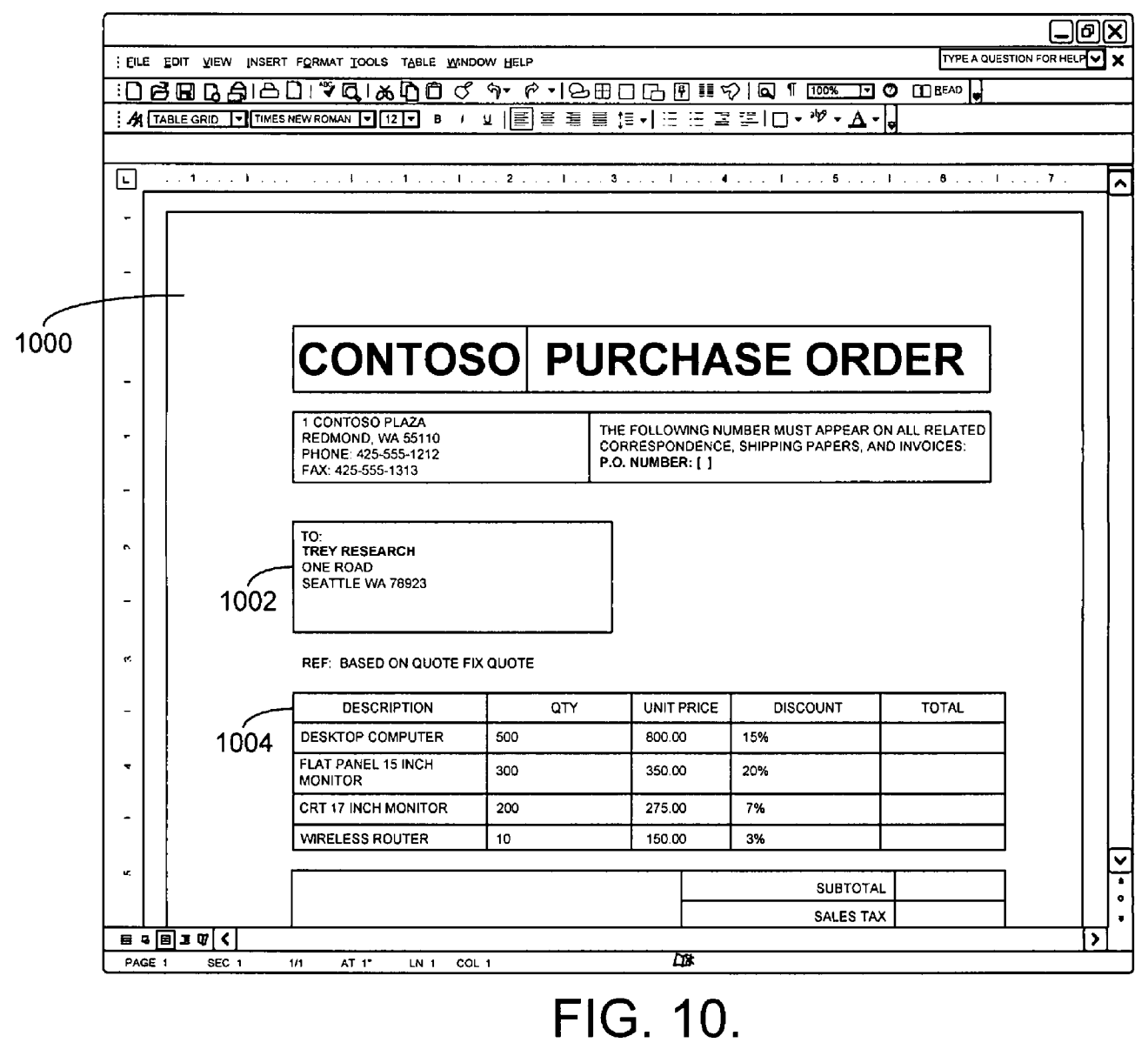

The LOB application provides the query result back in standard XML format that embodies both the data and the meta-data, as shown at block 912. For example, the LOB application may provide the query result as an ADO.NET dataset or as an XML that complies with the structure of the business objects and properties. After receiving the query result, the business object/property map (i.e. previously created to generate the data query) is traversed in conjunction with the XML data from the LOB application, and data is copied into the appropriate schema nodes, as shown at block 914. The result of the process is a document containing merged LOB application data, as shown at block 916. An exemplary data-merged document 1000, corresponding with the marked-up template 704 of FIG. 7, is illustrated in FIG. 10.

As discussed previously, a business object may have a one-to-one relationship or a one-to-many relationship with a parent business object. This relationship is captured as an attribute of the schema node attached to the document template. If a business object has a one-to-one relationship with a parent business object, the data merge involves copying data elements from the data source to the corresponding schema node. For example, as shown in FIG. 10, customer information for a single customer has been merged into the document within the area 1002. In contrast, if a business object has a one-to-many relationship, data from the data source is iterated through creating repeating document elements, such as table rows, list bullets, and the like. For example, as shown in FIG. 10, rows have been created in the table 1004 for the multiple product line items associated with the current quote.

Interactive LOB Data Merging

The initial data merge allows LOB application data to be integrated into a document template, providing a data-merged document. However, an information worker may wish to modify a document after data has been merged into it. Accordingly, in some embodiments of the present invention, an active link between the data-merged document and the LOB application data is maintained after the initial data merge to allow for interactive data merging. As an information worker navigates through a data-merged document, a user interface may be dynamically constructed based on a current context within the document, thereby providing a dynamic context-sensitive interface for interactively modifying the document. The user interface allows underlying business objects to be queried and corresponding data to be copied into the document.

Figure 11:
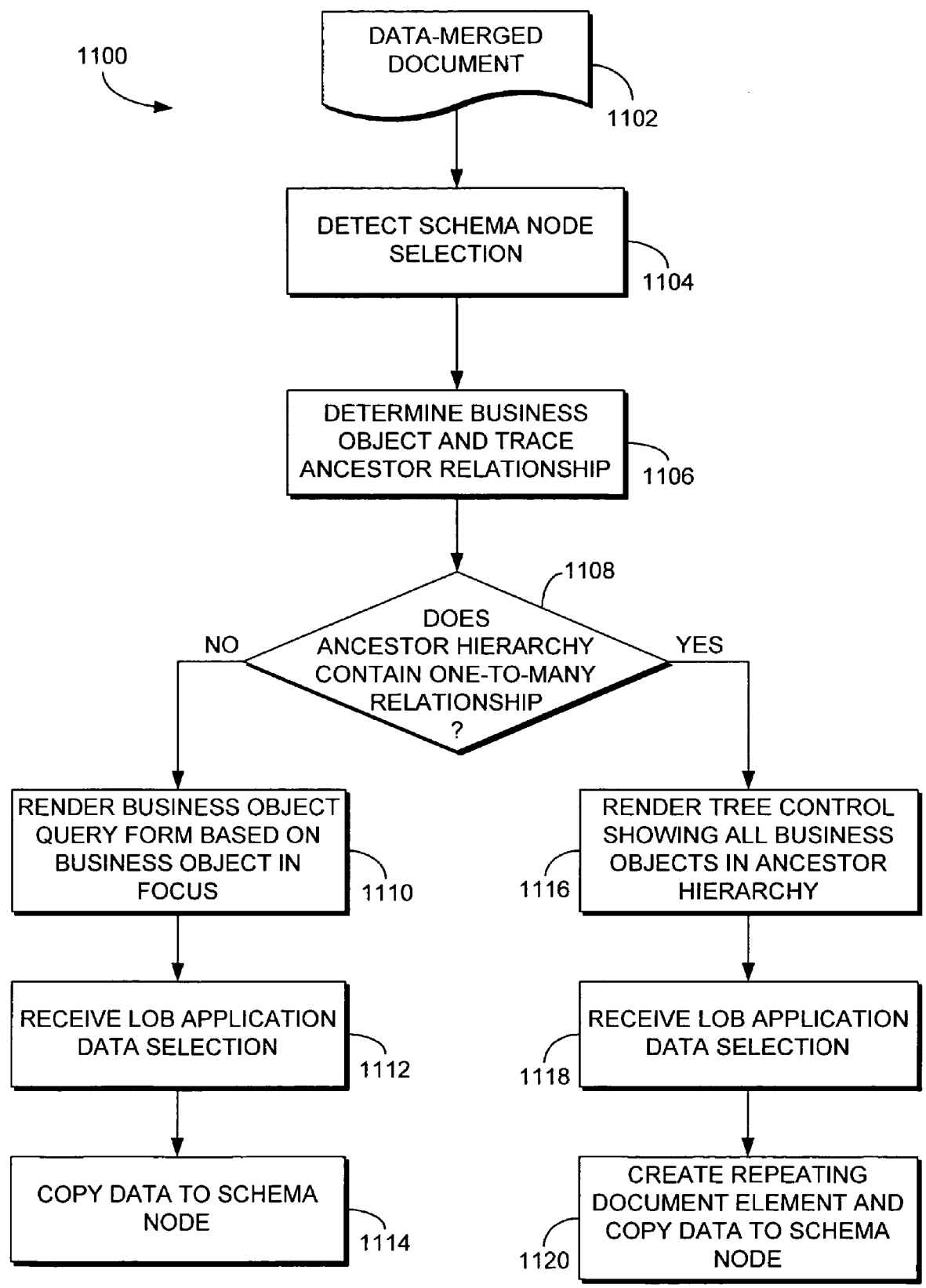
FIG. 11 is a flow diagram showing a method for interactively merging LOB application data into a data merged document in accordance with an embodiment of the present invention.

Referring now to FIG. 11, a flow diagram is provided showing a method 1100 for interactively merging data into a data merged document 1102 in accordance with an embodiment of the present invention. Initially, selection of a particular schema node is detected, as shown at block 1104. For example, an information worker may select a portion of the document containing customer information (e.g., by placing the cursor within the area containing customer information). Based on the selection, the business object corresponding with the selected node (e.g., a customer business object) is determined and the ancestor relationship of related business objects is traced to the top-level business object, as shown at block 1106.

A dynamic context-sensitive user interface may be generated and a hierarchal data query may be formed to query LOB application data based on the ancestor hierarchy. The user interface and data query are dependent upon the type of relationships (i.e. one-to-one or one-to-many) within the ancestor hierarchy. Accordingly, whether the ancestor hierarchy contains a one-to-many relationship is determined, as shown at block 1108. If the ancestor hierarchy does not contain any one-to-many relationships, a user interface may be presented that comprises a simple query form based on the business object in focus, as shown at block 1110. An information worker may review the LOB application data and select data to be merged into the document, as shown at block 1112. Based on the selection, data is copied into the appropriate schema node within the document, as shown at block 1114.

Alternatively, if the ancestor hierarchy contains a one-to-many relationship, a user interface containing a tree view is rendered showing all business objects in the ancestor hierarchy, as shown at block 1116. An information worker may review the LOB application data and select data to be merged into the document, as shown at block 1118. Based on the selection, data is copied into the appropriate schema node within the document by creating a repeating document element (e.g., a table row or a list bullet), as shown at block 1120. When data is copied into the document, the primary key of the record may be copied into the "Id" attribute of the generic business object schema. This "Id" attribute is used to limit the scope of the data query.

Figure 12:
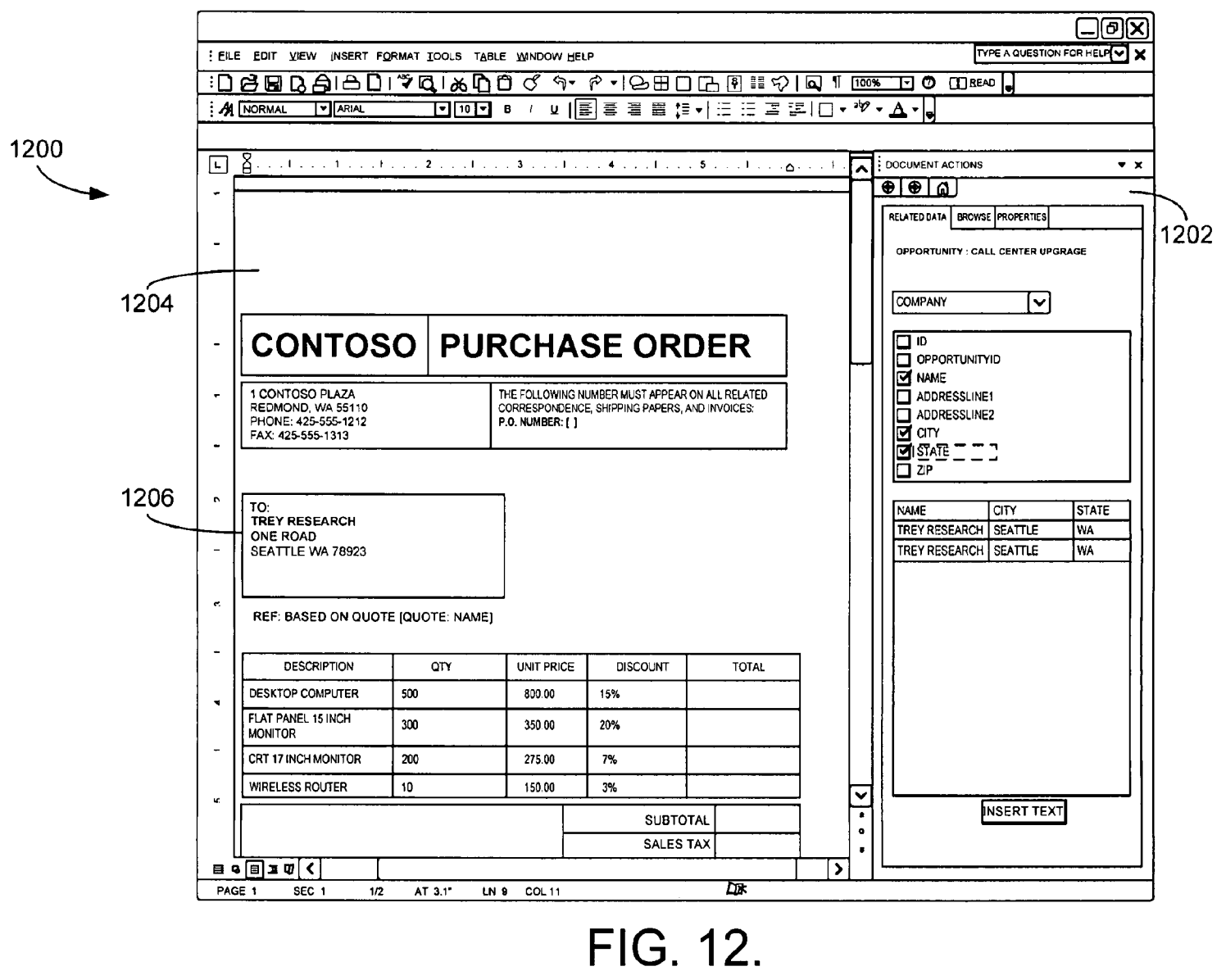

FIG. 12 illustrates a screen display 1200 with a dynamically-rendered, context-sensitive user interface for a selected business object having an ancestor hierarchy that does not contain a one-to-many relationship. The user interface comprises an action pane 1202 for dynamically querying LOB application data, which is shown adjacent a document 1204. As shown in FIG. 12, an information worker has selected a document section 1206 containing company information corresponding to a company business object, which has a one-to-one relationship with a parent business object. Accordingly, data related to the company business object is queried from the LOB application, and the action pane 1202 presents the queried data. An information worker may then employ the action pane 1202 to select an instance of the LOB application data to be copied into the document 1204.

Figure 13:
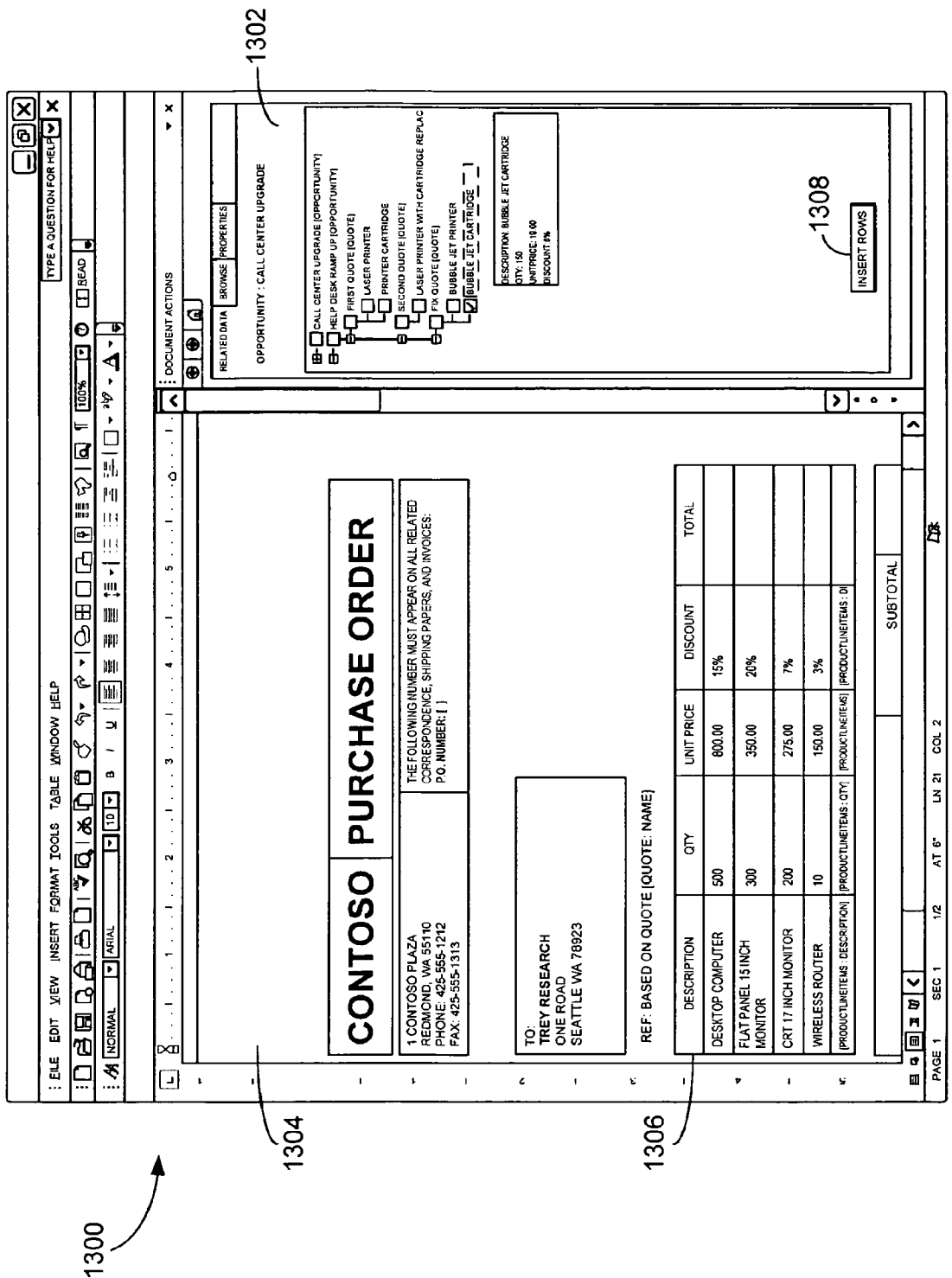
FIG. 13 is an illustrative screen display showing a data-merged document and associated user interface for interactively merging data into the data-merged document, wherein the ancestor hierarchy of a selected business object contains a one-to-many relationship in accordance with an embodiment of the present invention.

Referring now to FIG. 13, a screen display 1300 is illustrated showing a dynamically rendered user interface for a selected business object having an ancestor hierarchy that contains a one-to-many relationship. The user interface comprises an action pane 1302 having a tree view of the ancestor hierarchy, which is shown adjacent to a document 1304. For example, as shown in FIG. 13, the user has selected the table 1306 to add a new product line item. The product line item business object has a one-to-many relationship with the parent business object, such that the tree view of the ancestor hierarchy is provided in the action pane 1302. The tool tip on the leaf-level node in the tree shows additional properties about the selected business object record (e.g., product line items). The information worker may select one or more leaf-level nodes (e.g., products) and click on the insert rows button 1308 to copy the selected data into the table 1306. A new row is then inserted in the table 1306 with the selected data.

Conclusion

As can be understood, embodiments of the present invention provide for creating documents by merging data from LOB applications into document templates within productivity applications without the need for custom programming. Further embodiments of the present invention provide for interactively merging data from LOB applications into data-merged documents.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. In a computer system having a graphical user interface including a display and a user interface selection device, a method of interactively merging data from a line-of-business (LOB) application into a document template, the document template having one or more schema nodes, the method comprising:

marking up the document template with a plurality of schema nodes, wherein each of the plurality of schema nodes is a placeholder for merging business data from the LOB application, and wherein marking up the document template includes:

accessing meta-data from the LOB application, wherein the meta-data represents a hierarchical structure of business data stored in a database, wherein the LOB application manages the business data, and wherein business data includes a plurality of business objects, wherein a first one of the plurality of business objects is linked to a second one of the plurality of business objects by a relationship;

attaching a schema to the document template, wherein the schema facilitates modeling business data based on the accessed meta-data; and attaching the plurality of schema nodes to the document template;

determining a current schema node within the document template, wherein the schema node is mapped to the document template;

determining a business object associated with the current schema node;

formulating a data query based on the current schema node mapped to the document template;

sending the data query to the LOB application;

receiving business data from the LOB application;

displaying a context-sensitive user interface on the display based on the business object associated with the current schema node, the context-sensitive user interface comprising the business data from the LOB application corresponding to the business object associated with the current schema node;

receiving, via the user interface selection device, a user selection of one or more instances of the business data from the LOB application;

creating a data-merged document by copying the one or more instances of the business data from the LOB application to the current schema node within the document template based on the user selection; and maintaining an active link between the data-merged document and the LOB application to allow for interactive merging, wherein the active link is maintained after copying the one or more instances of the business data from the LOB application to the current schema node.

2. The method of claim 1, wherein displaying a context-sensitive user interface comprises:

tracing an ancestor hierarchy of the business object to a top-level business object;

determining if the ancestor hierarchy comprises a one-to-many relationship;

and displaying the context-sensitive user interface based.

3. The method of claim 2, wherein the ancestor hierarchy is determined not to comprise a one-to-many relationship, and the user interface comprises a business object query form based on the business object associated with the current schema node.

4. The method of claim 2, wherein the ancestor hierarchy is determined to comprise a one-to-many relationship, and the user interface comprises a tree control showing all business objects in the ancestor hierarchy.

5. The method of claim 4, wherein copying the one or more instances of the data from the LOB application to the current schema node within the document template comprises creating a repeating document element and copying the one or more instances of data into the repeating document element.

6. The method of claim 5, wherein the repeating document element comprises at least one of a table row and a list bullet.

7. The method of claim 1, wherein the placeholder is shown as an XML tag.

8. The method of claim 1, wherein the placeholder is shown as text.

9. The method of claim 1, further comprising providing an option to the user for toggling between two views, wherein, in a first view, the placeholder is shown as an XML tag and wherein, in a second view, the placeholder is shown as text.

10. A computer system having a graphical user interface including a display and a user interface selection device, wherein the computer system includes a processor that executes computer-readable instructions, said execution causing the computer system to perform a method of interactively merging data from a line-of-business (LOB) application into a document template, the document template having one or more schema nodes, the method comprising:

marking up the document template with a plurality of schema nodes, wherein each of the plurality of schema nodes is a placeholder for merging business data from the LOB application, and wherein marking up the document template includes:

accessing meta-data from the LOB application, wherein the meta-data represents a hierarchical structure of business data stored in a database, wherein the LOB application manages the business data, and wherein business data includes a plurality of business objects, wherein a first one of the plurality of business objects is linked to a second one of the plurality of business objects by a relationship;

attaching a schema to the document template, wherein the schema facilitates modeling business data based on the accessed meta-data; and attaching the plurality of schema nodes to the document template;

determining a current schema node within the document template, wherein the schema node is mapped to the document template;

determining a business object associated with the current schema node;

formulating a data query based on the current schema node mapped to the document template;

sending the data query to the LOB application;

receiving business data from the LOB application;

displaying a context-sensitive user interface on the display based on the business object associated with the current schema node, the context-sensitive user interface comprising the business data from the LOB application corresponding to the business object associated with the current schema node;

receiving, via the user interface selection device, a user selection of one or more instances of the business data from the LOB application;

creating a data-merged document by copying the one or more instances of the business data from the LOB application to the current schema node within the document template based on the user selection; and maintaining an active link between the data-merged document and the LOB application to allow for interactive merging, wherein the active link is maintained after copying the one or more instances of the business data from the LOB application to the current schema node.

11. The system of claim 10, wherein displaying a context-sensitive user interface comprises:

tracing an ancestor hierarchy of the business object to a top-level business object;

determining if the ancestor hierarchy comprises a one-to-many relationship; and displaying the context-sensitive user interface based.

12. The system of claim 11, wherein the ancestor hierarchy is determined not to comprise a one-to-many relationship, and the user interface comprises a business object query form based on the business object associated with the current schema node.

13. The system of claim 11, wherein the ancestor hierarchy is determined to comprise a one-to-many relationship, and the user interface comprises a tree control showing all business objects in the ancestor hierarchy.

14. The system of claim 13, wherein copying the one or more instances of the data from the LOB application to the current schema node within the document template comprises creating a repeating document element and copying the one or more instances of data into the repeating document element.

15. The system of claim 14, wherein the repeating document element comprises at least one of a table row and a list bullet.

16. The system of claim 10, wherein the placeholder is shown as an XML tag.

17. The system of claim 10, wherein the placeholder is shown as text.

18. The system of claim 10, further comprising providing an option to the user for toggling between two views, wherein, in a first view, the placeholder is shown as an XML tag and wherein, in a second view, the placeholder is shown as text.

19. One or more computer storage media having computer-executable instructions embodied thereon that, when executed by a computing device, cause the computing device to perform a method of interactively merging data from a line-of-business (LOB) application into a document template, the document template having one or more schema nodes, the method comprising:

marking up the document template with a plurality of schema nodes, wherein each of the plurality of schema nodes is a placeholder for merging business data from the LOB application, and wherein marking up the document template includes:

accessing meta-data from the LOB application, wherein the meta-data represents a hierarchical structure of business data stored in a database, wherein the LOB application manages the business data, and wherein business data includes a plurality of business objects, wherein a first one of the plurality of business objects is linked to a second one of the plurality of business objects by a relationship;

attaching a schema to the document template, wherein the schema facilitates modeling business data based on the accessed meta-data; and attaching the plurality of schema nodes to the document template;

determining a current schema node within the document template, wherein the schema node is mapped to the document template;

determining a business object associated with the current schema node;

formulating a data query based on the current schema node mapped to the document template;

sending the data query to the LOB application;

receiving business data from the LOB application;

displaying a context-sensitive user interface on the display based on the business object associated with the current schema node, the context-sensitive user interface comprising the business data from the LOB application corresponding to the business object associated with the current schema node;

receiving, via the user interface selection device, a user selection of one or more instances of the business data from the LOB application;

creating a data-merged document by copying the one or more instances of the business data from the LOB application to the current schema node within the document template based on the user selection; and maintaining an active link between the data-merged document and the LOB application to allow for interactive merging, wherein the active link is maintained after copying the one or more instances of the business data from the LOB application to the current schema node.

20. The media of claim 19, wherein the placeholder is shown as an XML tag.

* * * * *